May 27, 1941.   G. C. DEVOL, JR   2,243,310
ELECTRONIC CONTROL FOR DOORS AND OTHER MACHINES
Filed Oct. 5, 1937   5 Sheets-Sheet 1

INVENTOR
GEORGE C. DEVOL, JR.
BY
Bohleber & Ledbetter
ATTORNEYS

May 27, 1941.  G. C. DEVOL, JR  2,243,310
ELECTRONIC CONTROL FOR DOORS AND OTHER MACHINES
Filed Oct. 5, 1937   5 Sheets-Sheet 2

INVENTOR
George C. Devol Jr.
BY
Symmestvedt & Lechner
ATTORNEYS

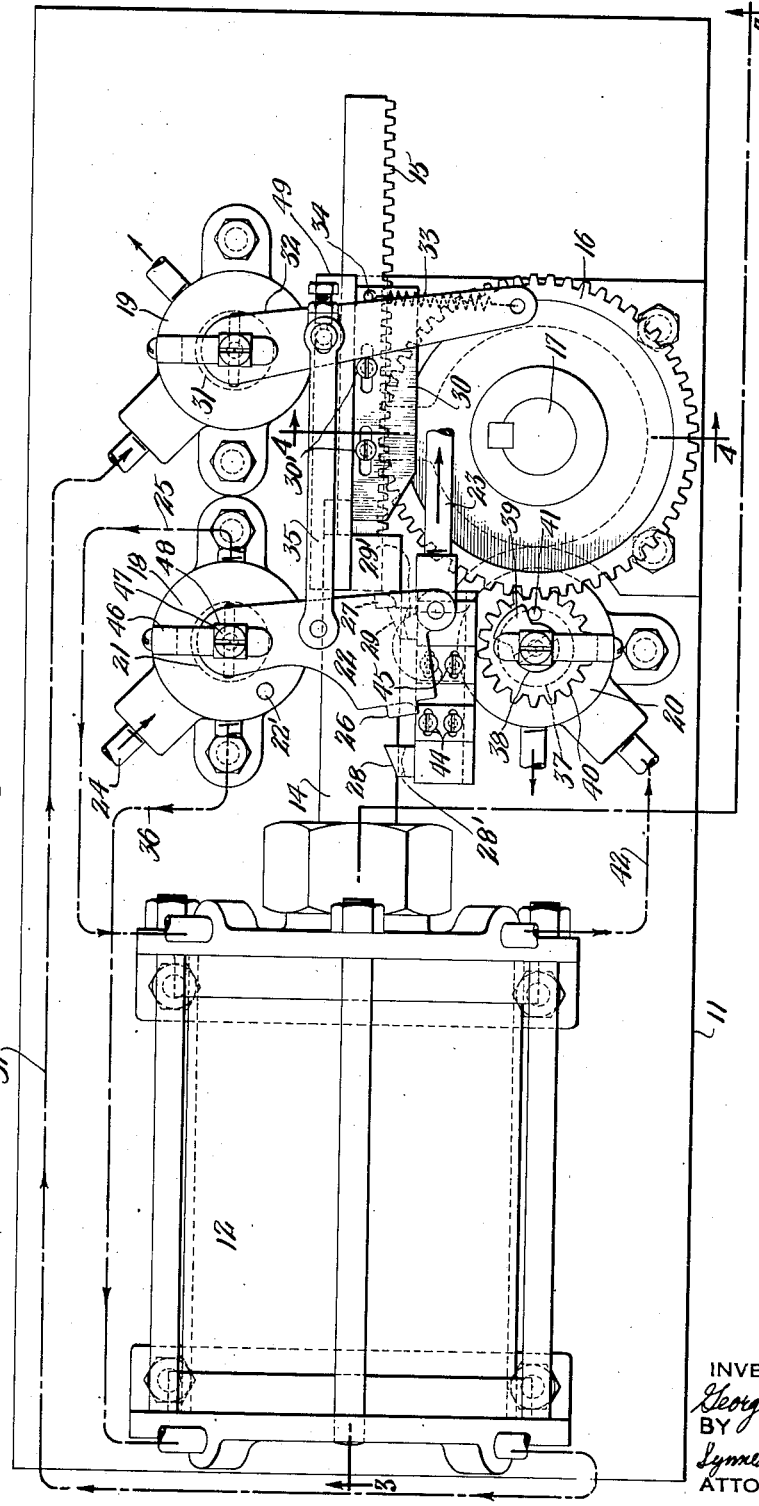

May 27, 1941.　　　G. C. DEVOL, JR　　　2,243,310
ELECTRONIC CONTROL FOR DOORS AND OTHER MACHINES
Filed Oct. 5, 1937　　　5 Sheets-Sheet 4

INVENTOR
George C. Devol Jr.
BY
Synnestvedt & Lechner
ATTORNEYS

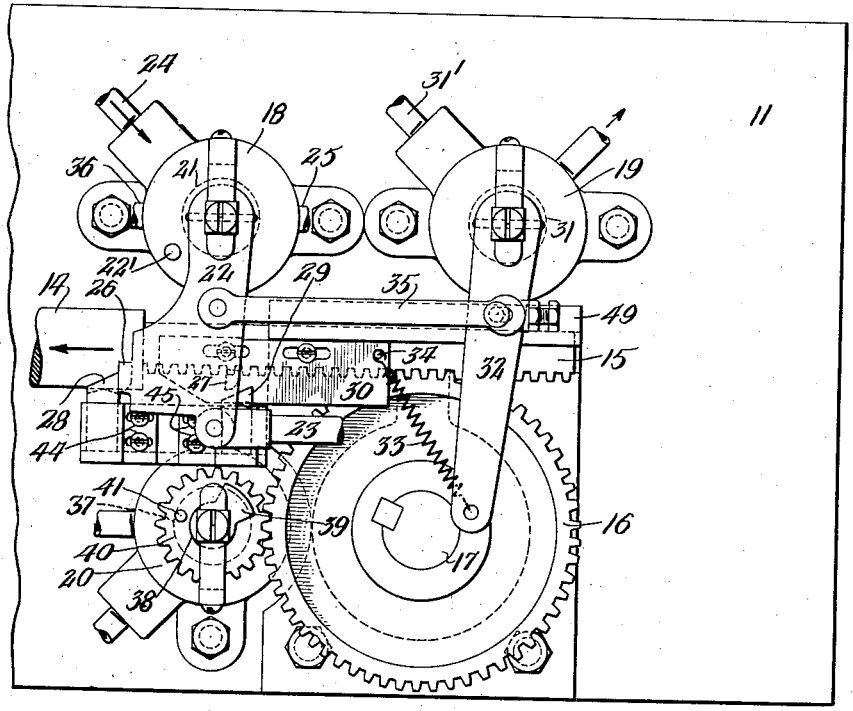

Patented May 27, 1941

2,243,310

UNITED STATES PATENT OFFICE 2,243,310

ELECTRONIC CONTROL FOR DOORS AND OTHER MACHINES

George C. Devol, Jr., St. Albans, N. Y., assignor, by mesne assignments, to The Prosperity Company, Inc., Syracuse, N. Y., a corporation of New York Application October 5, 1937, Serial No. 167,397

1 Claim. (Cl. 268—66)

This invention relates to an electronic control for doors and other machines, and it is particularly useful in connection with a photo-electric cell control to widen and improve the use of the latter by reason of my new combination.

An object of this invention is to produce a new control for a motor means used in connection with the power operation of doors and other devices such as valves, locks, conveyors, presses, signals, fluid flow apparatus, and other machines.

In carrying out this invention, it is one purpose among others to combine electrical-capacity control with photo-electric control by which to obtain results and performances with this new electronic combination not heretofore possible to attain with either alone. In this connection, it is now possible with this invention to exercise a new method of automatic control over any type of motor means, such as a fluid-pressure motor or an electric motor, used for all those general purposes to which motors, engines, and the like are now applied in industrial and domestic service.

The nature, other objects and advantages of the invention will appear from the following.

The accompanying drawings show an example of the invention by which its principle will be understood and are thus illustrative of any number of embodiments and uses in various types of machines.

Figure 2 is a plan view of one form of fluid-pressure motor means suitable for operating doors under the control of the new combination shown in Figure 1.

Figure 5 is a partial plan view similar to Figure 2, with the operating parts in an advanced position.

Figure 6 is a view similar to Figure 5 with the operating parts in a still further advanced position.

Figure 1:
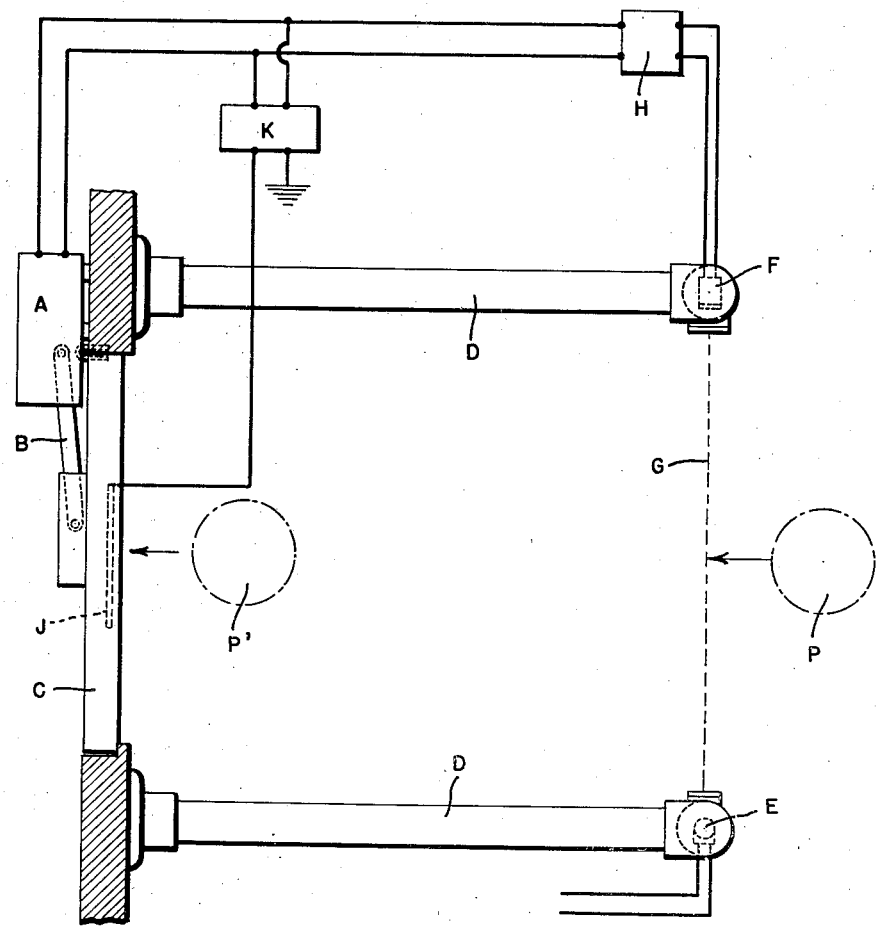
Figure 1 is a schematic view, partially in section, illustrating the application of the invention to control a door operating motor.

Referring to Figure 1, the reference character A indicates, as a whole, a self-contained operating unit or more particularly a motor means having an operating arm B adapted to be connected with a door C which is to be opened and closed. In approaching the door, the person P passes between a pair of guide rails D—D. One of these rails contains a light source E, while the other rail carries a photo-electric cell F. A beam of light G thus passes across the entrance path to the door and into the photo-electric cell. Interruption of the light beam causes the photo-electric cell to operate a relay switch contained as one of the operating elements in a photocell amplifying unit H of any well known form employed in the electronic art, and also a solenoid (not shown) constituting a part of the operating unit or motor means A. The solenoid controls the motor means to open and close the door. As will further appear, when a person has passed through the light beam and also through the door, the motor means A is so timed that the door will then start closing.

If desired, however, a safety means may be provided for preventing closing of the door, as, for example, if a person should stop at P' after passing through the beam G and linger before going through the door. The preferred safety means comprises what is known in the electronic art as a body capacity circuit. Any known body capacity circuit employed in this art may be utilized. I prefer, however, to provide, within the door, a metallic plate or screen shield J which constitutes one end of the body capacity circuit. The person being grounded makes up the other line of the circuit, and at any time a person is within the operating range of this screen J, a body capacity controlling unit K of any usual construction will act on the solenoid within the operating unit A holding the door in open position as long as a person remains within the range of the capacity circuit. The body capacity circuit may be made somewhat insensitive so that it will only be effective when a body is in close proximity to the door. This will prevent the door from opening when persons or objects are positioned outside of the guide rails but in the vicinity of the door.

Figure 1A:
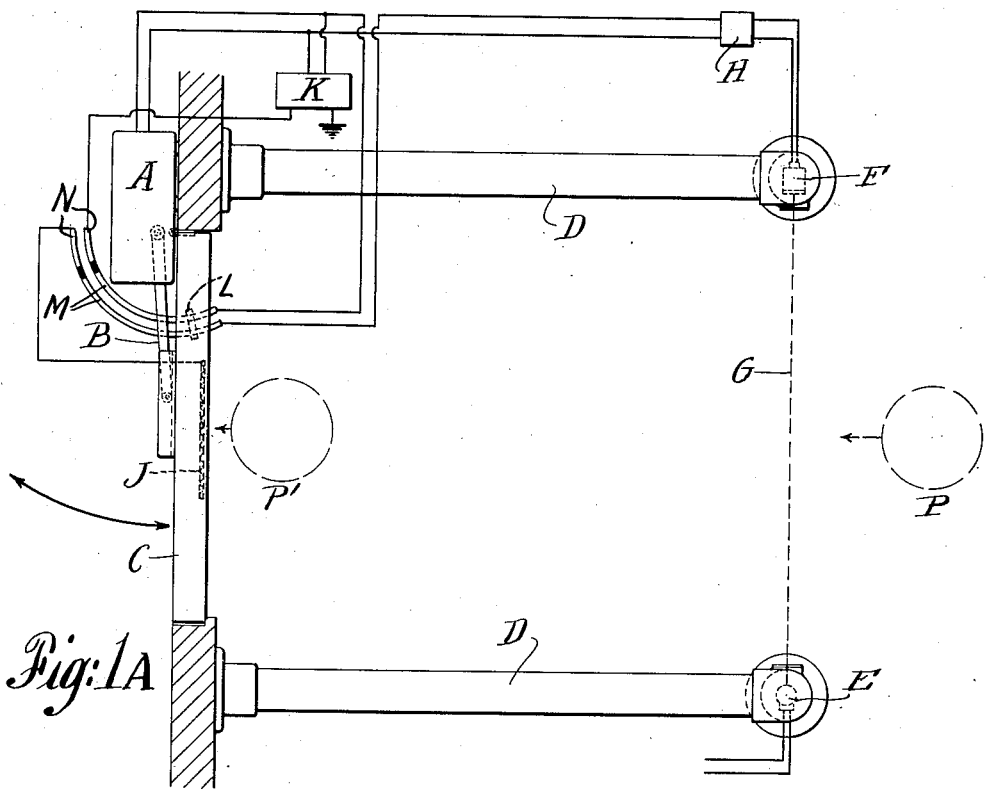
Figure 1A is a view similar to Figure 1, showing in addition a switching arrangement.

If desired, switching means may be used to connect the photocell circuit F, H with the motor operating unit A during the operating movement, to disconnect the same at some point in the movement of the motor unit, and to reestablish the connection upon the return movement. The switching means may also connect the electrode J with the capacity unit K when the photocell circuit F, H is disconnected and disconnect the electrode when the photocell circuit is again connected. Any suitable switching means may be used for this purpose, such as the switching arrangement shown in Figure 1A. The door C carries a metallic contact element L which slidably engages a pair of arcuate metal conductors M, one of which may be connected directly to the door operating power unit A, and the other may be connected to the photo-electric cell amplifying unit H. The arcuate conductors M are so positioned and are of such a length that the wiping contact L will bridge them for all positions of the door except when it is substantially wide open. Additional arcuate contact members N may be provided beyond the ends of the contact members M, and electrically separated therefrom, and these members N may be included in the circuit between the electrostatic screen J and the capacity unit K, so that the screen is only connected to the unit K when the door is in its wide open position and the contact L is bridging the two conductors N.

When the door is in closed position, the photo-electric cell circuit is connected to the motor operating unit A, and remains so connected while the door is swinging open, but when the door reaches wide open position, the photo-electric cell circuit will be disconnected from the power unit A and the electrode J and the capacity control circuit of the unit K then becomes effective.

With this general arrangement, therefore, there is provided an operating circuit and a safety circuit to open and close a door automatically and safely until the person or persons passing through is or are entirely clear of the door.

The door operating power unit A is mounted above and toward the hinge side of the door. On reference to Figures 2 and 3 it will be seen that the unit is made up of a main base plate 11 having secured to it, toward one end, a fluid pressure cylinder 12. Actuated by pressure within the cylinder is a piston 13 which moves a piston rod 14. The end of the piston rod has rack teeth 15 engaging a spur gear 16 keyed to the shaft 17. The shaft 17 has the door operating arm B fastened to its lower end. The other end of the operating arm is connected with the door as shown in Figure 1. On rotation of the shaft 17 the door is opened or closed as the case may be.

Fastened also to the base plate 11 is a main pressure or inlet valve 18 and two exhaust valves 19 and 20. The valve stem 21 of the inlet valve 18 carries an operating arm 22 to which is fastened an arm 23 connected to the solenoid (not shown) referred to above. When the solenoid is energized following the interruption of the beam, the arm 22 is moved to the position shown in Figure 2, and in this position, the valve 18 is open to admit air pressure from pipe 24 connected to any suitable source of pressure, as, for example, a compressor, to pipe 25 and enters the cylinder 12, tending to move the piston 13 toward the left. Valve 20 is closed and valve 19 is open, as described.

The arm 22 has two depending lugs 26 and 27 which cooperate with stops 28 and 29 yieldingly held in advanced position. These stops hold the arm 22 in either of two positions. When the arm is in the position shown in Figure 2, the lug 27 is latched behind stop 29, holding the valve 18 open to admit pressure as described.

Fastened to the rack 15 is a stop releasing plate 30 having adjusting screws 30'. The stop releasing plate 30 is adapted to act upon the stops 28 and 29, on the cam surfaces 28' and 29' thereof.

The valve stem 31 of exhaust valve 19 has fastened to it an operating arm 32. A spring 33 has one end connected to the operating arm 32 and the other end fastened to a pin 34 on the plate 30. Connecting both arms 22 and 32 is an adjustable link 35.

With both valves 18 and 19 open as shown in Figure 2, and with the piston rod 14 moving toward the left, the plate 30 moves with it until it strikes the cam surface 29' on the stop 29. It depresses said stop, releasing the arm 22. Under the tension of the spring 33, the arm 22 is moved toward the left until the lug 26 abuts against the stop 28. The parts are now in the position shown in Figure 5 and the door is almost open. In this position air is still exhausting from the left-hand end of cylinder 12 through pipe 31', valve 19 and exhaust pipe, to the atmosphere. Valve 19 is almost closed, giving a cushioning effect to prevent slamming. (The length of the cushioning period can be altered by adjustment of the link 35.)

Of course, the movement of the rack 15 rotates the gear 16 and the shaft 17 and causes opening movement of the door.

In Figure 6 the piston is shown at the end of its stroke, the door being wide open. The plate 30 has released stop 26 from lug 28 and the tension of spring 33 has further moved the valve operating arm 22 and has rotated the valve stem 21 of valve 18, so that now pressure is admitted from pipe 24 to pipe 36 to enter the cylinder 12 at the left-hand end thereof, thus moving the piston 13 toward the right, which starts closing the door. In the meantime, valve arm 22 has reached its limit of movement and is against stop 22'. Valve 19 is closed and valve 20 open, as will appear.

Attached to the valve stem 37 of exhaust valve 20 is a small collar 38 (see Figure 7) having a lug 39. Mounted loosely on the valve stem 37 between the collar 38 and the valve body 20 is a small spur gear 40 having an upwardly extending pin 41. Small gear 40 meshes with the large gear 16. Rotation of the gear 40 engages the pin 41 with the lug 39 and rotates the valve stem 37 and changes the position of the valve, exhausting pressure from pipe 42 through the valve to the atmosphere.

The piston 14, moving to the right, tends to return the valve operating arms 22 and 32 to position and closes the door. The arm 22 is moved to the right until lug 26 engages stop 28 and is held there until the solenoid is again actuated when all parts are returned to operating position again, as shown in Figure 2. A description of valve 20 will suffice for valve 19 as well. The conical valve body and its seat are merely machined and the valve is pressure held to its seat. Leakage is imperceptible.

Figure 7:
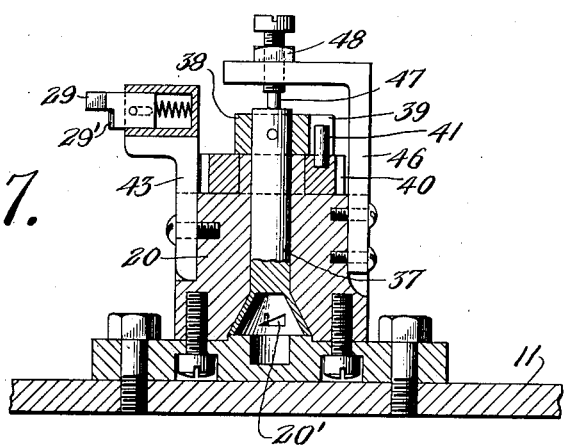
Figure 7 is a detailed vertical sectional view of one of the valves embodied in the motor means.

The exhaust valve 20, as shown in Figure 7, supports an angle iron 43 on one leg of which is fastened the spring stops 28 and 29. The position of these stops can be adjusted by resetting of the screws 44 and 45 should heavy pressure tend to bind the valve stems 37, 21 and 31, the pressure may be eased by the medium of the angle arm 46 mounted on the side of the valve 20 and having an adjusting screw 47. A lock nut 48 keeps the valve in its set position. The valve port 20' is preferably triangular so as to give a cushioning effect as the valve closes.

The piston rod 14 and the rack 15 are guided in a bracket 49 which is bolted to the base plate 11 and also supports the gear 16 and the shaft 17 and operating rod B. The whole operating unit is covered by a casing 10.

It will be readily understood by those skilled in the art that when the body capacity controlling unit K is actuated by conditions such as described, the solenoid will be actuated to move the valve parts to the position shown in Figure 2, thereby preventing closure of the door. The wiring is only diagrammatically shown. It will be understood that connections may be made so that the photo-cell is cut out toward the end of the opening movement, and the body capacity will cut in, the latter being cut out as the door begins to close, and the former being cut in.

The mechanism is simple and effective in operation and of relatively long life.

It will, of course, be understood that it is unnecessary to provide a safety feature such as the body capacity control circuit. It will be further understood that the motor means A may have other uses than that shown and described.

Figures 3, 4:
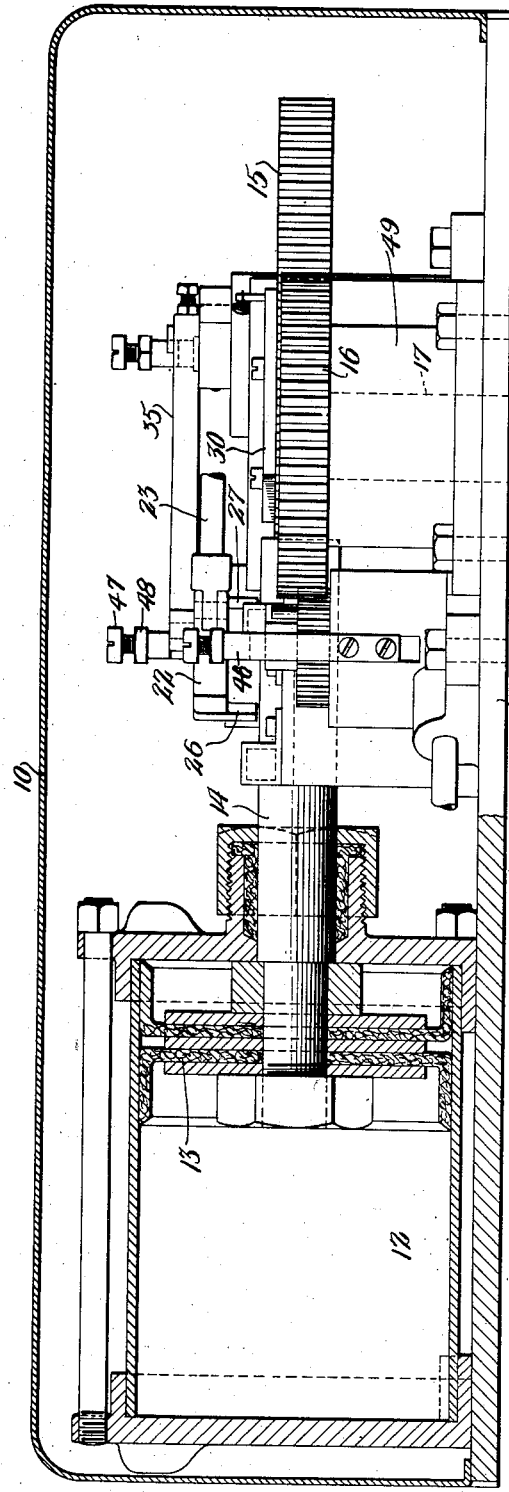
Figure 3 is a vertical sectional view taken on the line 3—3 of Figure 2.
Figure 4 is a section taken on the line 4—4 of Figure 2.

In order that the door may be readily opened under emergency conditions, a shear pin or other suitable device is introduced into the system, as, for example, the shear pin 17'. This is shown in Figure 4 where a shear pin anchors the door-operating arm to the shaft 17 and will not shear or break under normal-operating power or force of the double-acting fluid-pressure door motor means 12. However, in any emergency where the mechanism may have been damaged, as by fire or other causes, a person can throw his weight against the door C and break the pin 17' and thus free the door from the motor means 12 for ordinary operation.

This invention is presented to fill a need for improvements in an electronic control for doors and other machines. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

In combination with a door, a door opening and closing mechanism normally holding the door in closed position, electrically operated means for controlling said mechanism including a light beam and a photo-electric cell effective on interruption of the beam, and a body capacity electrical safety means preventing undesirable closure of the door including an electrode; together with switching connections controlled by the door for cutting out the photo-electric cell circuit and cutting in the electrode of the body capacity control circuit when the door is substantially open, and for cutting in the photo-electric cell circuit and cutting out the electrode of the body capacity control circuit as the door moves toward closed position.

GEORGE C. DEVOL, JR.